United States Patent
Crue et al.

(10) Patent No.: US 6,204,999 B1
(45) Date of Patent: Mar. 20, 2001

(54) METHOD AND SYSTEM FOR PROVIDING A WRITE HEAD HAVING A CONFORMING POLE STRUCTURE

(75) Inventors: Billy Wayne Crue, San Jose; Kenneth Everett Knapp, Livermore; Zhupei Shi, San Jose; Mark David Thomas, Hollister, all of CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/220,252

(22) Filed: Dec. 23, 1998

(51) Int. Cl.⁷ .................................................. G11B 5/147
(52) U.S. Cl. ............................................................. 360/126
(58) Field of Search .................................. 360/125, 126, 360/120, 119

(56) References Cited

U.S. PATENT DOCUMENTS

| | | | | |
|---|---|---|---|---|
| 4,636,897 | * | 1/1987 | Nakamura et al. | 360/119 |
| 4,651,248 | * | 3/1987 | Shiiki et al. | 360/119 |
| 4,677,036 | * | 6/1987 | Nakamura et al. | . |
| 4,703,383 | * | 10/1987 | Katou et al. | 360/126 |
| 4,751,599 | * | 6/1988 | Katou | 360/126 |
| 4,816,946 | * | 3/1989 | Kira et al. | 360/110 |
| 4,881,144 | * | 11/1989 | Yuito et al. | 360/125 |
| 4,943,882 | * | 7/1990 | Wada et al. | 360/126 |
| 5,296,993 | * | 3/1994 | Aboaf et al. | 360/126 |
| 5,369,539 | * | 11/1994 | Shimizu | 360/126 |
| 5,462,637 | * | 10/1995 | Thiele | 216/22 |
| 5,608,964 | | 3/1997 | Shimizu | 29/603.14 |

FOREIGN PATENT DOCUMENTS 56-145517 * 11/1981 (JP) .

* cited by examiner

Primary Examiner—William Klimowicz
(74) Attorney, Agent, or Firm—Sawyer Law Group LLP

(57) ABSTRACT

A system and method for providing a write head is disclosed. The write head includes a first pole and a write gap. At least a portion of the write gap is on a portion of the first pole. The method and system include providing a coil layer including a plurality of turns on the write gap. Each of the plurality of turns is separated by a pitch. The method and system further include depositing an insulator to provide an insulating layer and providing a second pole above the insulating layer. The insulating layer has a first profile substantially conforming to the plurality of turns.

25 Claims, 5 Drawing Sheets

METHOD AND SYSTEM FOR PROVIDING A WRITE HEAD HAVING A CONFORMING POLE STRUCTURE

FIELD OF THE INVENTION

The present invention relates to write heads for magnetic recording and more particularly to a method and system for providing a write head having a conforming pole structure which allows for a more efficient magnetic coupling between a coil layer and pole, higher density writing, and increased reliability.

BACKGROUND OF THE INVENTION

Conventional write heads may be used in conjunction with magnetoresistive (MR) heads. Together, the MR head and the write head can write to and read from magnetic recording media. The conventional write head includes a first pole, a second pole, and one or two coil layers. Each of the coil layers has several turns. The first and second poles are separated by a write gap. Magnetic flux through a portion of the write gap is used to write to the magnetic recording media. The write head is covered by an overcoat layer.

In order to generate the magnetic flux, current is passed through the coil layers. The coil layers are electrically isolated from the first pole, from the second pole, and from each other. However, the coil layers are magnetically coupled to the second pole. Current driven through the coil layers generates a magnetic field. Because the coil layers are magnetically coupled to the second pole, the second pole directs the magnetic flux generated by the coil layers to the write gap. The first pole is the return of the flux path.

The material used to electrically insulate the coil layers is typically an organic photoresist. When the write head is fabricated, photoresist is spun onto the first coil layer. The second coil layer is provided on the layer of photoresist. A second layer of photoresist is then spun onto the second coil layer. The second pole is plated on the second layer of photoresist.

Although the organic photoresist is capable of electrically insulating the coil layers, the use of photoresist causes a variety of problems. Because the photoresist is used to insulate the coil layers, the photoresist layers are made relatively thick. For example, in one conventional head the photoresist is approximately three microns thick. As a result, the top of each layer of photoresist is relatively flat in comparison to the shape of each of the coil layers being insulated. Because the photoresist is relatively thick, the magnetic coupling between the coil layers and the poles is reduced. Consequently, more current is required to produce the desired field for writing to the magnetic recording media. In addition, the photoresist has a relatively large coefficient of thermal expansion. During fabrication, the temperature of the write head increases greatly. Changes in temperature cause the photoresist layer to expand. This may cause cracking in portions of the write head, including the overcoat layer.

Accordingly, what is needed is a system and method for providing a write head in which the problems due to the insulation of the coil layers are reduced. The present invention addresses such a need.

SUMMARY OF THE INVENTION

The present invention provides a method and system for providing a write head. The write head includes a first pole and a write gap. At least a portion of the write gap is on a portion of the first pole. The method and system comprise providing a coil layer including a plurality of turns on the write gap. Each of the coil turns is separated by a pitch. The method and system further comprise depositing an insulator to provide an insulating layer and providing a second pole above the insulating layer. The insulating layer has a profile substantially conforming to the plurality of turns.

According to the system and method disclosed herein, the present invention provides a write head in which the insulating layer substantially conforms to the coil layer. In addition, an inorganic material having a relatively low coefficient of thermal expansion may be used as the insulator. As a result, the write head may have a more efficient magnetic coupling between the coil layers and the second pole and may undergo less damage on thermal cycling, thereby increasing overall system performance, reliability, and yield.

DETAILED DESCRIPTION OF THE INVENTION

The present invention relates to an improvement in write heads. The following description is presented to enable one of ordinary skill in the art to make and use the invention and is provided i n the context of a patent application and its requirements. Various modification s to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
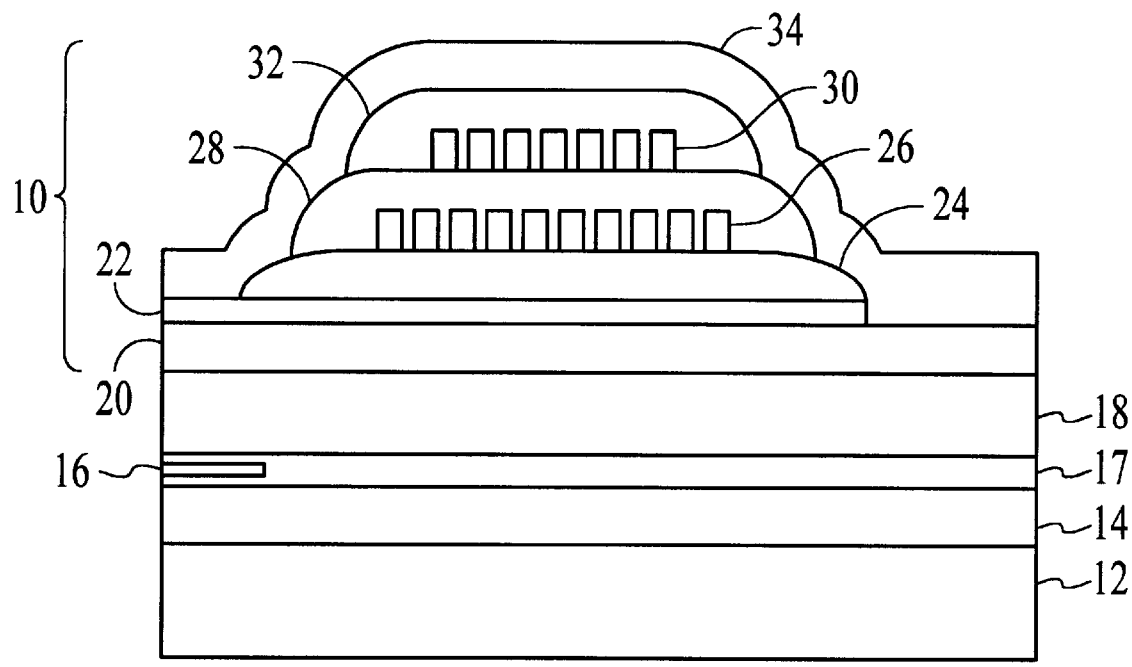
FIG. 1A is a diagram of a cross-section of a conventional write head.
Figure 1B:
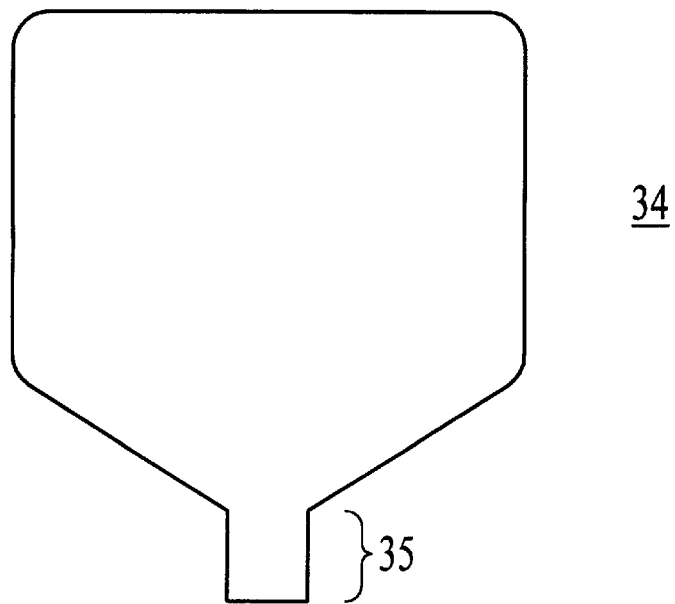
FIG. 1B is a plan view of the second pole in a conventional write head.

FIGS. 1A and 1B depict a conventional write head 10. FIG. 1A is a block diagram of a device including a conventional write head 10. The conventional write head 10 is fabricated on a magnetoresistive (MR) read head including a substrate 12, a first shield 14, a read gap 17, a MR element 16, and a second shield 18. The conventional write head 10 includes a first pole 20, a write gap 22, a first insulator 24, a first coil layer 26, a second insulator 28, a second coil layer 30, a third insulator 32, and a second pole 34. In addition, the write head 10 may be covered with an overcoat layer (not shown). FIG. 1B depicts a plan view of the second pole 34. A portion 35 of the second pole 34 defines the width of a track (not shown) on a recording media (not shown) that is being written. The first insulator 24, the second insulator 28, and the third insulator 32 typically consist of an organic photoresist. Typically, NiFe is used for the first pole 20 and the second pole 34.

Figure 2:
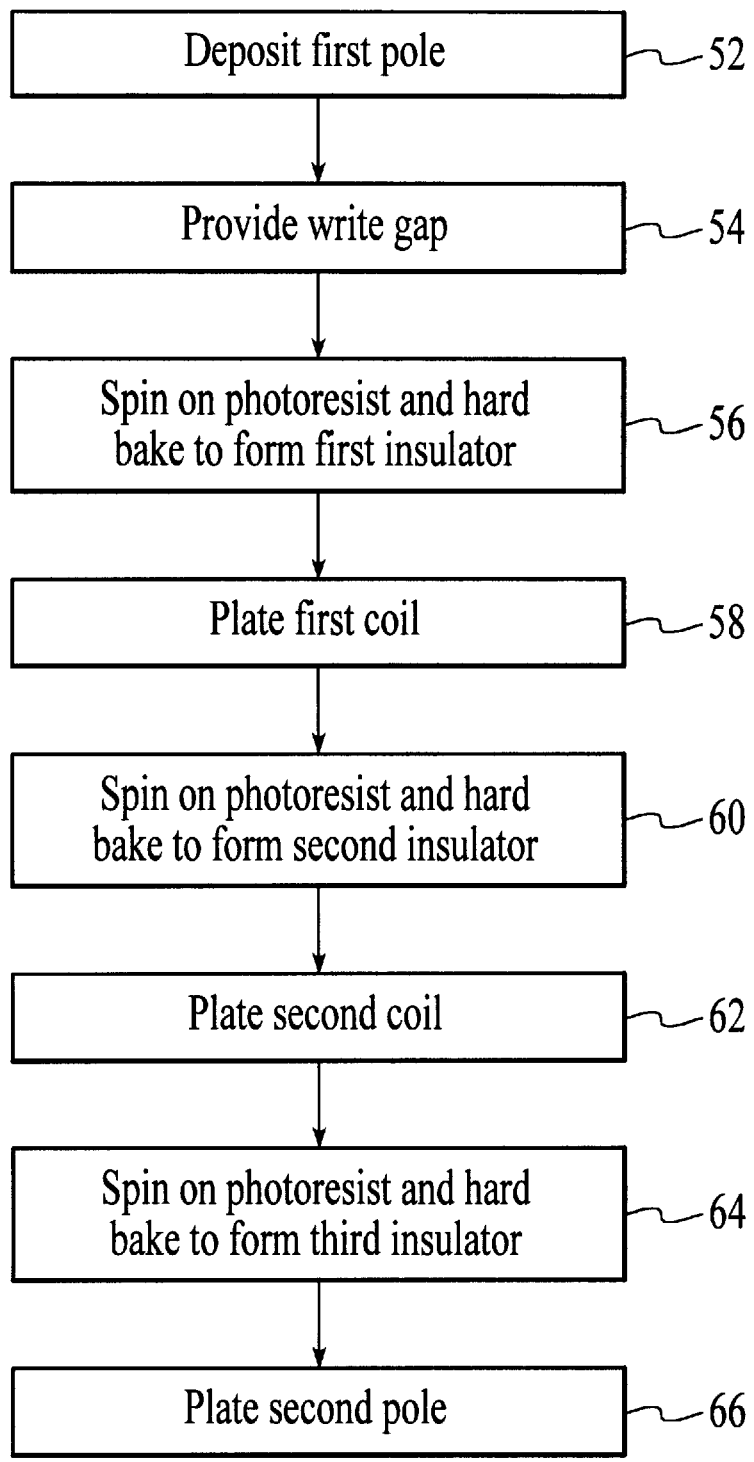
FIG. 2 is a flow chart depicting a conventional method for fabricating a conventional write head.

FIG. 2 depicts a conventional method 50 for providing the conventional write head 10. The conventional method 50 typically starts after the second shield 18 has been provided.

The first pole 20 is deposited on the second shield 18, via step 52. Typically, NiFe is plated onto the second shield 18 in step 52. The write gap 22 is then provided on the first pole 20, via step 54. An organic photoresist is then spun onto the first pole, via step 56. The spun photoresist forms the first insulator 24. The step 56 also includes baking the photoresist to form the first insulator 24. The first coil layer 26 is then plated on the first insulator 22, via step 58. Another layer of organic photoresist is then spun on the first coil layer 26, forming the second insulator 28, via step 60. As it is spun, the photoresist fills in the gaps between the turns of the first coil layer 26 and covers the first coil layer 26. Thus, the second layer of photoresist insulates the turns of the first coil layer 26 and insulates the first coil layer 26 from the second coil layer 30. The step 60 also includes baking the photoresist to form the second insulator 28. The second coil layer 30 is then plated on the second insulator 28, via step 62. A third layer of organic photoresist is spun on, via step 64. The photoresist forms the third insulator 32. The step 64 also includes baking the photoresist to form the third insulator 32. The second pole 34 is then plated on the third insulator 32, via step 66. Step 66 may be performed by sputtering soft magnetic materials onto the third insulator 32. The soft magnetic material sputtered may include CoZrTa or an FeNX compound, where X stands for Al, Rh, Ta or other similar materials.

Although the conventional write head 10 made in accordance with the conventional method 50 functions, those with ordinary skill in the art will realize that the use of the organic photoresist for insulation has several drawbacks. When the photoresist is spun across the write head 10, the photoresist must adequately cover the features currently exposed. Thus, the photoresist used for the second insulator 28 must be capable of crossing and covering the turns in the first coil layer 26. Thus, the photoresist is made relatively thick in order to ensure that the coil layers 26 and 30 are adequately insulated. For example, the portion of the second insulator 28 above the turns of the first coil layer 26 is on the order of three microns in thickness. The pitch of a coil layer is the distance between the leading edge of one turn and the leading edge of the next turn. The pitch of the first coil layer 26 is on the order of three microns. As depicted in FIG. 1A, the second insulator is 28 relatively thick and the profile of the top of second insulator 28 is relatively flat because of the use of photoresist for the second insulator 28. This is also true for the third insulator 32. Because of the thickness of the second insulator 28 and the third insulator 32, the first and second coil layers 26 and 30, respectively, are not well coupled to the second pole 34. More current is required to generate an adequate magnetic field in the write gap 22 to write to the magnetic recording media (not shown). Because more current is driven in the coil layers 26 and 30, the current cannot be switched rapidly. The speed that the current can be switched is related to the size of the bit recorded. When the current can be switched at a higher frequency, smaller bits can be written. Thus, conventional write head 10 is limited in the density of bits that can be written. Furthermore, driving more current in the coil layers 26 and 30 increases the power dissipation in the conventional head 10, resulting in large Johnson thermal noise.

Use of the photoresist also adversely affects manufacturing. The thick photoresist used in the first insulator 24, the second insulator 28, and the third insulator 32 causes the write head 10 to have a relatively large stack height. Sputtering of a seed layer such as NiFe does not uniformly cover an area having a large stack height. Regions at or near an angle tend to have receive less of the sputtered material. Thus, the second pole 34 is more difficult to plate because the write head 10 has a large stack height. In addition, steps 56, 60, and 64 of the conventional method 50 depicted in FIG. 2 include baking each of the layers of photoresist. Consequently, the method 50 is typically time consuming. Baking may also damage the MR element 16, reducing the yield achieved in fabrication. The photoresist also has a relatively large coefficient of thermal expansion. The temperature of the write head 10 varies widely during fabrication. Consequently, the first insulator 24, the second insulator 28, and the third insulator 32 may expand and contract during manufacturing. This may cause cracking of the overcoat layer (not shown). Similarly, the temperature of the write head 10 increases during use. Expansion of the first insulator 24, the second insulator 28, and the third insulator 32 may also crack the overcoat layer (not shown) during use. Therefore, the yield achieved when producing the write head 10 and the reliability of the write head 10 are adversely affected.

The present invention provides for a method and system for providing a write head. The write head includes a first pole and a write gap. At least a portion of the write gap is on a portion of the first pole. The method and system comprise providing a coil layer including a plurality of turns on the write gap. Each of the plurality of turns is separated by a pitch. The method and system further comprise depositing an insulator to provide an insulating layer and providing a second pole above the insulating layer. The insulating layer has a first profile substantially conforming to the plurality of turns.

The present invention will be described in terms of a write head having a particular configuration and fabricated on a MR head. However, one of ordinary skill in the art will readily recognize that this method and system will operate effectively for other configurations and for write heads not fabricated on a MR head. In addition, the present invention is described in terms of a particular number or turns in a coil layer and particular materials. However, nothing prevents another number of turns or other materials from being used. Moreover, the present invention finds greatest utility when used in conjunction with a single coil layer structure. However, nothing prevents the use of the present invention with a multiple coil layer structure.

Figure 3:
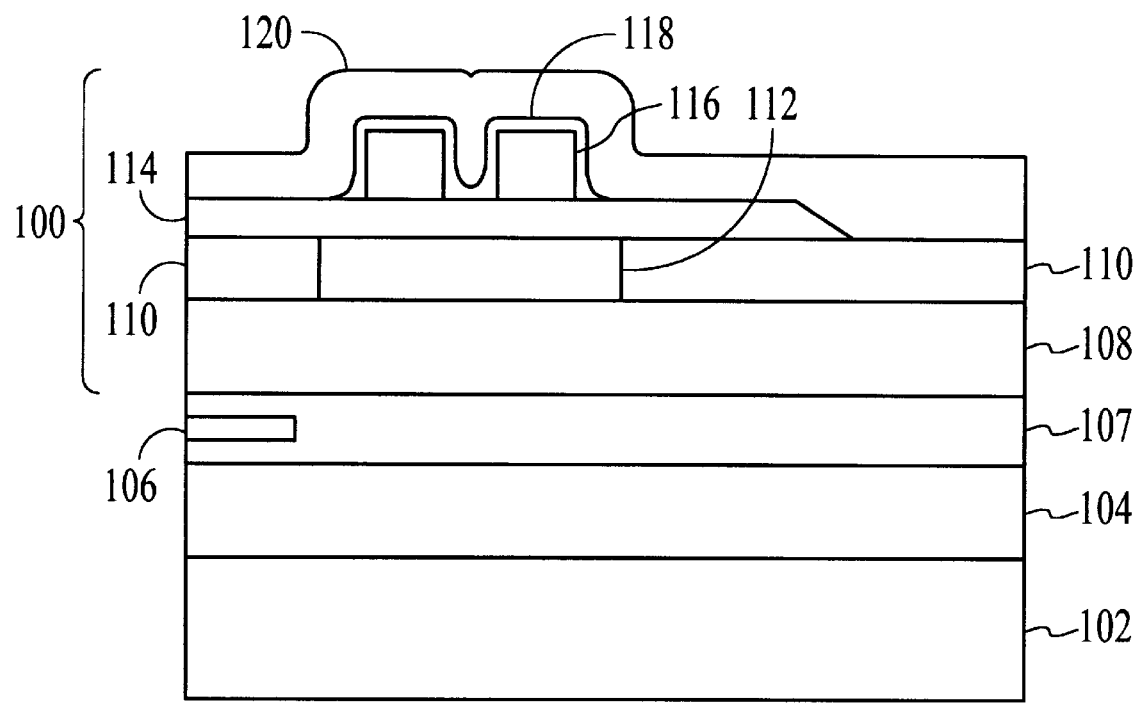
FIG. 3 is a diagram of a cross-section of a write head in accordance with the present invention.

To more particularly illustrate the method and system in accordance with the present invention, refer now to FIG. 3 depicting a cross-section of one embodiment of a device including a write head 100 in accordance with the present invention. The device is fabricated on a substrate 102. In a preferred embodiment, the write head 100 is fabricated on a MR head including a first shield 104, a MR element 106, a read gap 107, and a second shield 108.

The write head 100 includes a first pole 110, a first insulator 112, a write gap 114, a coil layer 116, a second insulator 118, and a second pole 120. In a preferred embodiment, the first pole 110 has an aperture therein. The first insulator 112 fills the aperture. Note, however, that nothing prevents the first insulator 112 from being formed on top of the first pole 110. Forming the first insulator 112 within the aperture, or within a recess (not shown) in the first pole 110, aids in reducing the stack height of the write head 100.

The write gap 114 separates the first coil layer 116 from the first insulator 112 and the first pole 110. The write gap also separates a portion of the second pole 120 from a portion of the first pole 110. A recording media (not shown) may be written to when placed near the surface of the write head 100 where the first pole 110 is separated from the second pole 120 by the write gap 114.

The layer 116 is on the write gap 114. For clarity, the coil layer 116 is depicted as having two turns, but could have another number of turns. In a preferred embodiment, the pitch of the coil layer 116 is approximately three microns, but could be less. The second insulator 118 insulates the coil layer 116 from the second pole 120. In a preferred embodiment, the thickness of the second insulator 118 is approximately 0.5 microns or less and may be 0.2 microns. Because the second insulator 118 is thin, the profile of second insulator 118 substantially conforms to the profile of the turns in the coil layer 116.

Figure 4:
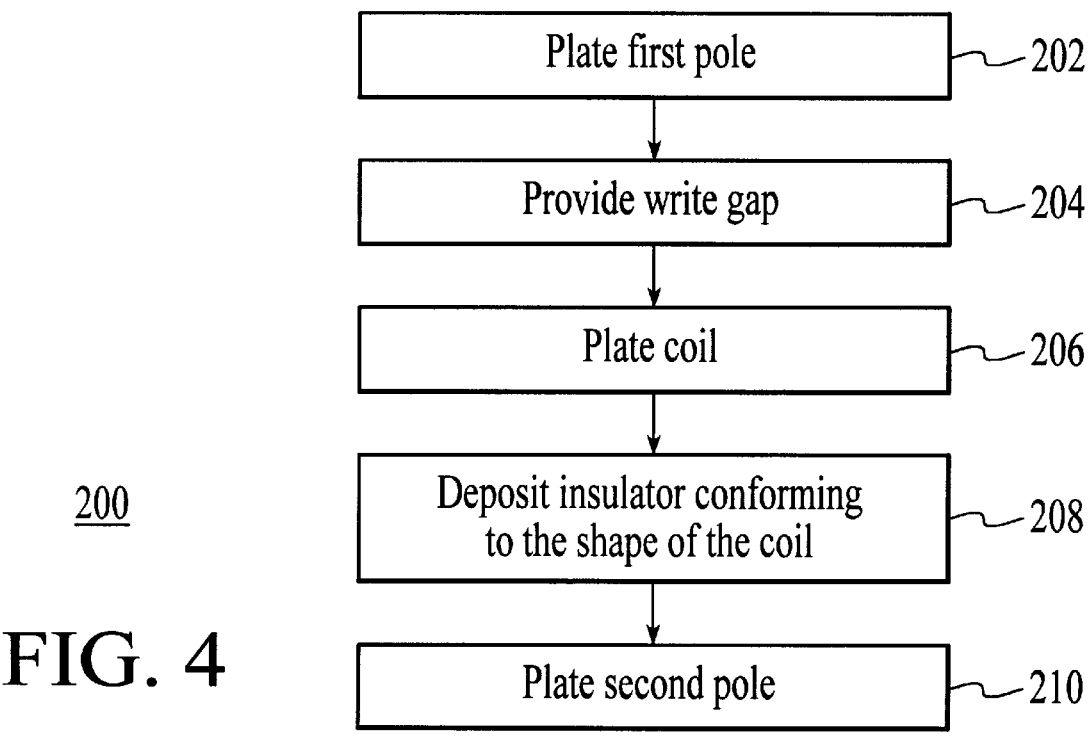
FIG. 4 is a flow chart depicting a method for providing a write head in accordance with the present invention.

FIG. 4 depicts a high-level flow chart of a method 200 for providing a write head 100 in accordance with the present invention. For clarity, only some of the steps performed in fabricating the write head 100 are depicted in FIG. 4. The method 200 preferably commences after the second shield 108 has been provided. The first pole is plated, via step 202. The write gap 114 is then provided, via step 204. The coil layer 116 having the desired pitch and number of turns is then plated, via step 206. The second insulator 118 is then deposited, via step 208. Preferably, the second insulator 118 is deposited in a vacuum chamber (not shown). For example, the second insulator 118 may be evaporated or sputtered in step 208. In a preferred embodiment, the insulator is an inorganic insulator, such as alumina or a silicon oxide. The second pole 120 is then plated on the second insulator 118, via step 210. For example, NiFe may be plated onto the second insulator 118 in step 210.

Referring back to FIGS. 3 and 4, the second pole 120 is magnetically coupled to the coil layer 116 in an efficient manner. Because the second insulator 118 deposited in step 208 is thin, the profile of the second insulator 118 substantially conforms to the profile of the turns of the coil layer 116. The profile of the lower portion of the second pole 120 substantially conforms to the profile of the second insulator 118 and, therefore, the profile of the turns of the coil layer 116. Thus, magnetic flux generated by the current in the coil layer 116 has a shorter path to travel to the tip of the second pole 120. As a result, the tip of the second pole 120 is strongly magnetically coupled to the coil layer 116. A lower current driven in the single coil layer 116 can provide a sufficient magnetic field in the tip of the second pole 120 and, therefore, the write gap 114, to write to recording media (not shown). Thus, less current, which can be provided in a single coil layer 116, generates the desired magnetic field in the write gap 114. This smaller current can be switched more rapidly. The frequency that the current and, therefore, the magnetic field can be switched is inversely related to the size of the bits that can be written. Thus, because of the magnetic coupling between the coil layer 116 and the second pole 120, the write head 100 can write at higher densities than the conventional write head 10 depicted in FIG. 1A.

Referring back to FIGS. 3 and 4, deposition of the second insulator 118 which is thin enough to conform to the profile of the turns of the coil layer 116 has other benefits. Because the second insulator 118 is thin and conforms to the profile of the turns of the coil layer 116, the pitch of the turns of the coil layer 116 may be reduced. This would allow more turns to be provided in the same space. For example, although the pitch in a current embodiment is three microns, the pitch may be reduced to 1.5 microns. In addition, in a preferred embodiment, the aspect ratio of the coil layer 116 may be reduced to three to 1. This reduces resistance of the coil layer 116 in comparison to a coil layer in a conventional write head 10 that is insulated using photoresist.

The second insulator 118 also simplifies processing. Because only a single coil layer 116 can be used, the stack height of the write head 100 is reduced. This simplifies deposition of the second pole 120. For example, if the second pole 120 is sputtered, the reduced height allows for more even coverage in the sputtering process. Consequently, the step 210 of providing the second pole 120 is simplified. Furthermore, because a second coil layer need not be plated, fabrication of the write head 100 is further simplified. The second insulator 118 may be deposited in a vacuum chamber in step 208. Because photoresist is not used to form the second insulator 118, the hard bake steps of the method 50 shown in FIG. 2 may be eliminated. Thus, fabrication of the write head 100 using the method 200 of FIG. 4 is eased.

Selection of the material used for the second insulator 118 which conforms to the profile of the turns of the coil layer 116 may also result in improvements. The inorganic insulator deposited in step 208 may be chosen to have a low coefficient of thermal expansion. As the temperature of the write head 100 cycles, the second insulator 118 will undergo less expansion and less contraction. The overcoat layer (not shown) or other layers are, therefore, less likely to crack. Consequently, yield and reliability may be improved. In addition, the material used for the second insulator 118 may be chosen to be relatively thermally conductive. In addition, the second insulator 118 is relatively thin. These characteristics reduce the heat retained in the second insulator 118. The temperature of the write head 100 may increase during use. Generally, an increased temperature results in reduced lifetime of a device. Because the second insulator 118 is less likely to retain heat, the second insulator 118 aids in reducing the temperature of the write head 100 during operation. The lifetime of the write head 100 is thereby extended.

Furthermore, deposition of the second insulator 118 in step 208 allows for greater control over the "zero-throat" position in the write head 100. The zero throat position is defined as the position where the second insulator 118 or the first insulator 24 in FIG. 1A pulls away from the write gap 114 or 22, respectively. The magnetic field in the write gap 114 or 22 depends on the zero throat position. In order to ensure that heads manufactured using a particular process can generate a magnetic field adequate for writing, the zero throat position should be controlled. Referring to FIG. 1A, because the organic photoresist used to form the first insulator 24 is spun on, the exact location of the zero throat position may vary from one conventional head 10 to another. Referring back to FIG. 3, the second insulator 118 is deposited. Consequently, the zero throat position may be well controlled by appropriately masking the write gap 114. In addition, the angle that the top of the second insulator 118 makes with the write gap may also be controlled. Consequently, the magnetic characteristics of the write head 100 may be well controlled.

Figure 5A:
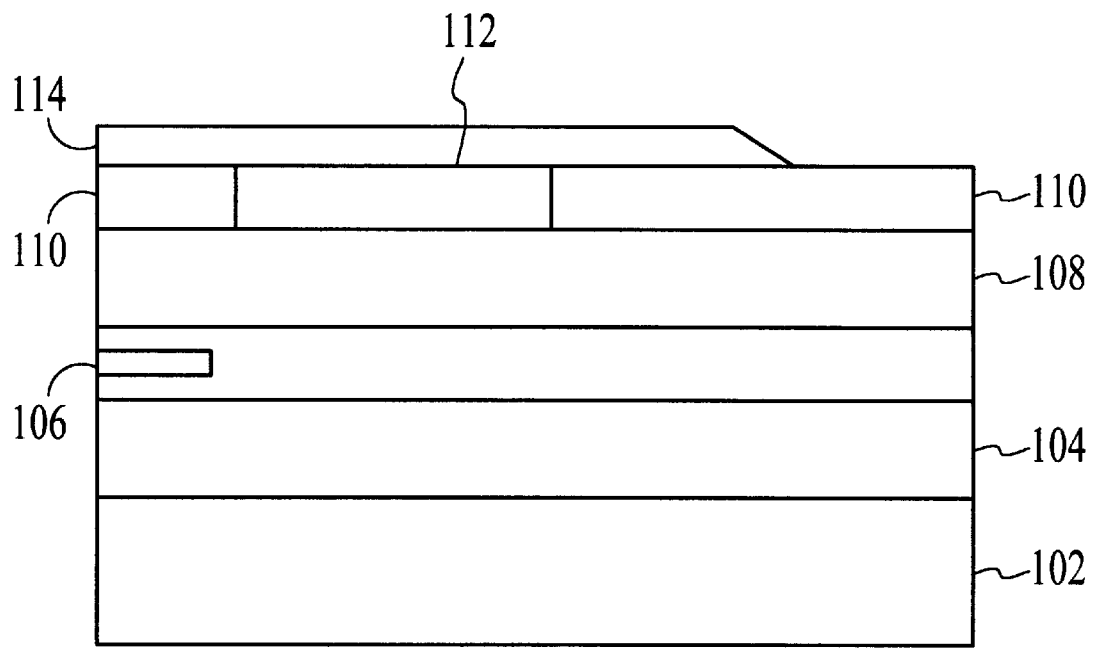
FIGS. 5A–5D are diagrams of a write head in accordance with the present invention during fabrication.
Figure 5B:
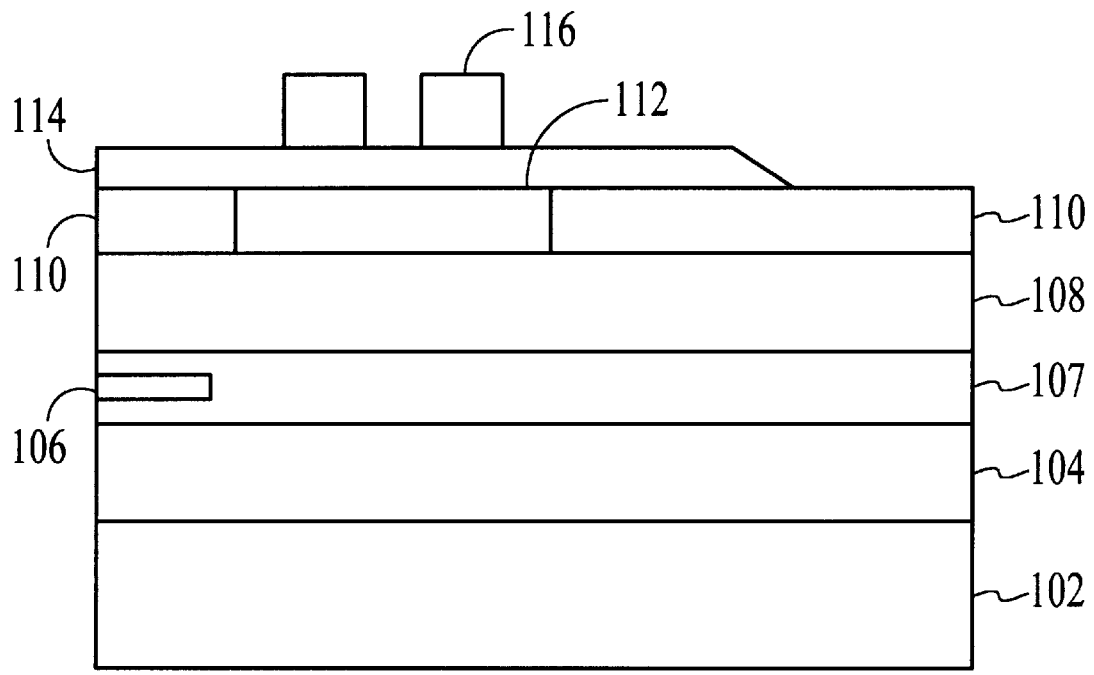
Figure 5C:
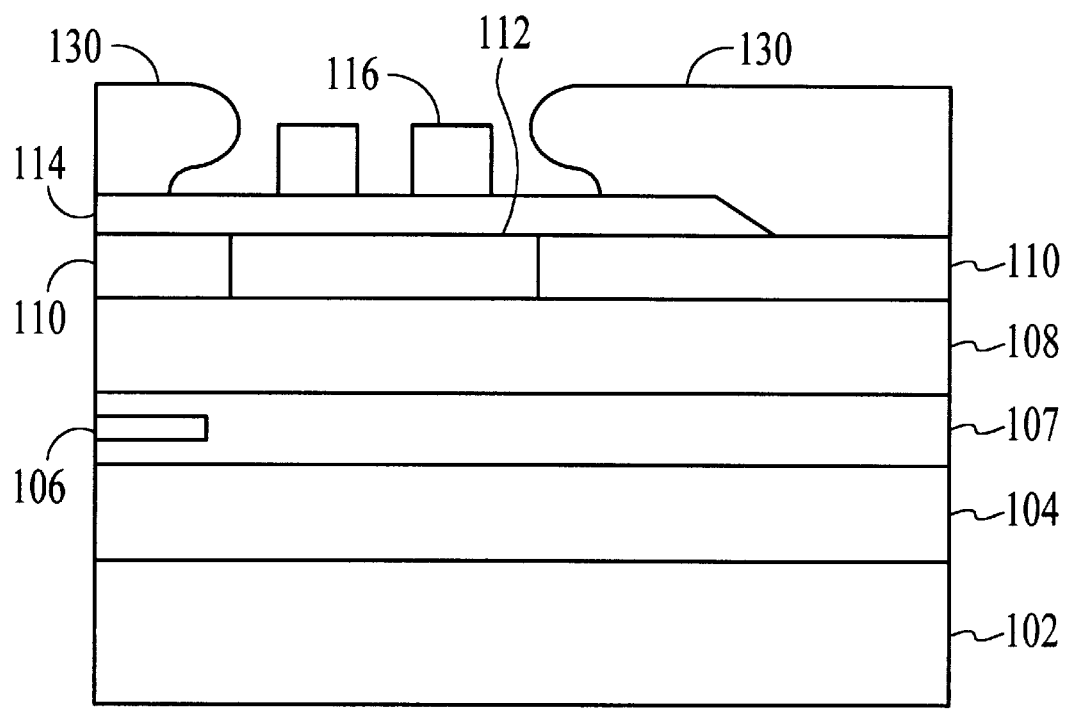
Figure 5D:
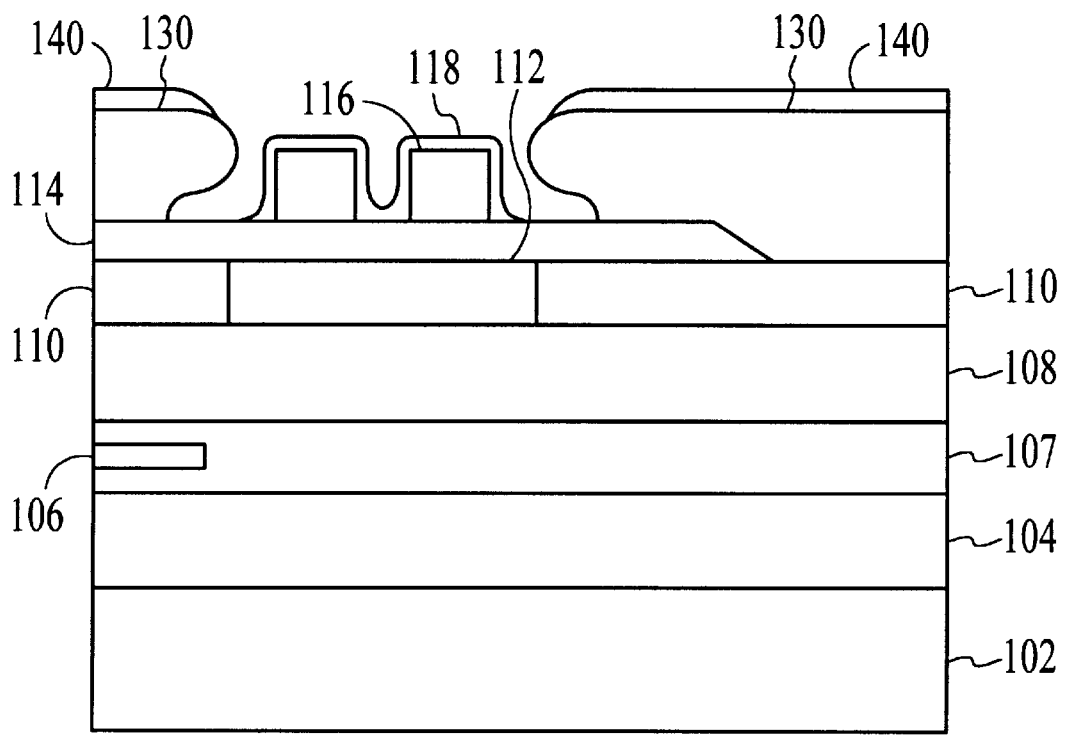

To more particularly describe processing of the write head 100 in general refer now to FIGS. 5A–5D. FIG. 5A depicts the write head 100 after the write gap 114 has been provided. Note that a portion of the first pole 110 is exposed to allow the second pole 120 to be coupled to the first pole 110. After the write gap 114 is provided, the surface of the write gap 114 is masked and the first coil layer 116 plated. FIG. 5B depicts the write head 100 after plating of the coil layer 116. In order to provide the second insulator 118 having the desired shape, a bilayer photoresist structure is provided. FIG. 5C depicts the write head 100 after the bilayer photoresist structure 130 has been provided. FIG. 5D depicts the write head 100 after the second insulator 118 has been deposited. The bottom portion of the bilayer photoresist structure is undercut. A first portion of the insulator deposited forms the second insulator 118. A second portion 140 of the insulator remains on the photoresist structure 130. The photoresist structure 130 and second portion 140 of the insulator will be lifted off prior to plating of the second pole 120.

The bilayer photoresist structure 130 and deposition of the insulator used for the second insulator 118 allow the geometry of the write head 100 to be controlled. Because the photoresist structure is undercut, the second insulator 118 develops a foot. This allows the second insulator 118 to pull away from the write gap 114 at the desired angle and the desired zero throat position. Consequently, the second pole 120, depicted in FIG. 3, has the desired geometry and magnetic characteristics. Use of the photoresist structure 130 and deposition of the insulator in step 208 of FIG. 4 also reduces the variation in geometry and magnetic characteristics between one write head 100 and another.

A method and system has been disclosed for a write head having improved magnetic efficiency and improved manufacturability. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A write head including a first pole and write gap, at least a portion of the write gap being on a portion of the first pole, the write head comprising:

a coil layer including a plurality of turns on the write gap and having a first profile, each of the plurality of turns being separated by a pitch, each of the plurality of turns having a top and a bottom, the top and the bottom of each of the plurality of turns defining a top surface and a bottom surface for the coil layer;

an insulating layer covering the coil layer and having a second profile substantially conforming to the first profile of the coil layer; and a second pole above the insulating layer, a portion of the second pole having a lower surface, the lower surface substantially conforming to the first profile of the coil layer such that a portion of the second pole extends between the top surface and the bottom surface of the coil layer and lies between a portion of the plurality of turns.

2. The write head of claim 1 wherein the insulating layer has a thickness of less than or equal to substantially 0.5 microns.

3. The write head of claim 1 wherein the coil layer is on a second portion of the write gap and wherein the head further includes:

a first insulator below the second portion of the write gap.

4. The write head of claim 1 wherein the insulating layer further includes a layer of alumina.

5. The write head of claim 1 wherein the insulating layer further includes a layer of silicon oxide.

6. A method for providing a write head including a first pole and write gap, at least a portion of the write gap being on a portion of the first pole, the method comprising the steps of:

(a) providing a coil layer including a plurality of turns on the write gap and having a first profile, each of the plurality of turns being separated by a pitch, each of the plurality of turns having a top and a bottom, the top and the bottom of each of the plurality of turns defining a top surface and a bottom surface for the coil layer;

(b) depositing an insulator to provide an insulating layer on the coil layer, the insulating layer having a second profile substantially conforming to the first profile of the coil layer; and (c) providing a second pole above the insulating layer, a portion of the second pole having a lower surface, the lower surface substantially conforming to first profile of the coil layer such that a portion of the second pole extends between the top surface and the bottom surface of the coil layer and lies between a portion of the plurality of turns.

7. The method of claim 6 wherein the insulator depositing step (a) further includes the steps of:

(b1) providing a bilayer photoresist structure having an undercut profile;

(b2) depositing the insulator to form the insulating layer having the profile substantially conforming to the plurality of turns; and (b3) removing the bilayer photoresist structure.

8. The method of claim 6 wherein the insulating layer depositing step (a) further includes the step of:

(b1) depositing the insulating layer to a thickness of less than or equal to substantially 0.5 microns.

9. The method of claim 6 wherein the coil layer providing step further includes the step of:

(a1) providing the coil layer on a second portion of the write gap and wherein the head further includes:
      a first insulator below the second portion of the write gap.

10. The method of claim 6 wherein the insulator is alumina.

11. The method of claim 6 wherein the insulator further includes silicon oxide.

12. A write head including a first pole and write gap, at least a portion of the write gap being on a portion of the first pole, the write head comprising:

a coil layer including a plurality of turns on the write gap, each of the plurality of turns being separated by a pitch, each of the plurality of turns having a top and a bottom, the top and the bottom of each of the plurality of turns defining a top surface and a bottom surface for the coil layer;

an insulating layer covering the coil layer, the insulating layer having a thickness, the thickness of the insulating layer being sufficiently thin to allow the pitch of the coil layer to be less than three microns; and a second pole above the inorganic insulating layer, a portion of the second pole extending between the top surface and the bottom surface of the coil layer and lying between a portion of the plurality of turns.

13. The write head of claim 12 wherein the insulating layer has a coefficient of thermal expansion, the coefficient of thermal expansion being a low coefficient of thermal expansion.

14. The write head of claim 13 wherein the coefficient of thermal expansion is sufficiently close to a coil coefficient of thermal expansion to prevent cracking of the insulating layer.

15. The write head of claim 13 wherein the coefficient of thermal expansion is sufficiently close to a second pole coefficient of thermal expansion to prevent cracking of the insulating layer.

16. The write head of claim 13 wherein the insulating layer has a first profile substantially conforming to the plurality of turns.

17. The write head of claim 12 wherein the insulating layer further includes a layer of alumina.

18. The write head of claim 12 wherein the insulating layer further includes a layer of silicon oxide.

19. A method for providing a write head including a first pole and write gap, at least a portion of the write gap being on a portion of the first pole, the method comprising the steps of:

(a) providing a coil layer including a plurality of turns on the write gap, each of the plurality of turns being separated by a pitch, each of the plurality of turns having a top and a bottom, the top and the bottom of each of the plurality of turns defining a top surface and a bottom surface for the coil layer;

(b) depositing an insulator to provide an inorganic insulating layer on the coil layer, the insulating layer having a thickness, the thickness of the insulating layer being sufficiently thin to allow the pitch of the coil layer to be less than three microns; and (c) providing a second pole above the inorganic insulating layer, a portion of the second pole extending between the top surface and the bottom surface of the coil layer and lying between a portion of the plurality of turns.

20. The method of claim 19 wherein the insulating layer has a coefficient of thermal expansion, the coefficient of thermal expansion being a low coefficient of thermal expansion.

21. The method of claim 20 wherein the coefficient of thermal expansion is sufficiently close to a coil coefficient of thermal expansion to prevent cracking of the insulator.

22. The method of claim 21 wherein the coefficient of thermal expansion is sufficiently close to a second pole coefficient of thermal expansion to prevent cracking of the insulator.

23. The method of claim 19 wherein the insulating layer has a first profile substantially conforming to the plurality of turns.

24. The method of claim 19 wherein the insulating layer further includes a layer of alumina.

25. The method of claim 19 wherein the insulating layer further includes a layer of silicon oxide.

* * * * *